United States Patent
McCarthy et al.

(10) Patent No.: US 8,972,083 B2
(45) Date of Patent: Mar. 3, 2015

(54) SYSTEM AND METHOD FOR AIRCRAFT THERMAL CAPACITY PREDICTION

(75) Inventors: Kevin M. McCarthy, West Lafayette, IN (US); Eric A. Walters, Brownsburg, IN (US); Alex J. Heltzel, Austin, TX (US)

(73) Assignee: PC Krause and Associates, Inc., West Lafayette, IN (US)

( * ) Notice: Subject to any disclaimer, the term of this patent is extended or adjusted under 35 U.S.C. 154(b) by 489 days.

(21) Appl. No.: 13/589,658

(22) Filed: Aug. 20, 2012

(65) Prior Publication Data

US 2013/0046423 A1    Feb. 21, 2013

Related U.S. Application Data

(60) Provisional application No. 61/525,004, filed on Aug. 18, 2011.

(51) Int. Cl.
*G01C 23/00* (2006.01)
*G06F 19/00* (2011.01)
*B64D 37/34* (2006.01)

(52) U.S. Cl.
CPC ............... *B64D 37/34* (2013.01); *Y02T 50/56* (2013.01); *Y02T 50/54* (2013.01)
USPC ................ 701/14; 701/3; 701/123; 60/238

(58) Field of Classification Search
USPC ........ 701/3, 14, 123, 34.2, 99, 100, 103, 104; 477/30; 60/233, 235, 238, 239, 904
See application file for complete search history.

(56) References Cited

U.S. PATENT DOCUMENTS

| | | | | | |
|---|---|---|---|---|---|
| 4,505,124 | A | * | 3/1985 | Mayer | 60/730 |
| 4,776,536 | A | * | 10/1988 | Hudson et al. | 244/135 R |
| 4,809,174 | A | * | 2/1989 | Momenthy | 701/3 |
| 5,615,118 | A | * | 3/1997 | Frank | 701/14 |
| 2004/0176887 | A1 | * | 9/2004 | Kent et al. | 701/3 |
| 2007/0050758 | A1 | * | 3/2007 | Arevalo et al. | 702/108 |
| 2009/0070091 | A1 | * | 3/2009 | Hanke et al. | 703/18 |
| 2009/0319153 | A1 | * | 12/2009 | Bradley et al. | 701/103 |
| 2010/0052948 | A1 | * | 3/2010 | Vian et al. | 340/963 |
| 2011/0232293 | A1 | * | 9/2011 | Leese | 60/772 |
| 2012/0297780 | A1 | * | 11/2012 | Bruno et al. | 60/772 |

\* cited by examiner

*Primary Examiner* — Tuan C. To
*Assistant Examiner* — Dale W Hilgendorf
(74) *Attorney, Agent, or Firm* — Ice Miller LLP

(57) ABSTRACT

A technique for identifying, projecting, displaying, and enhancing the thermal capacity for an aircraft is disclosed wherein the thermal capacity is defined as the amount of time or range the aircraft can continue until a thermal limit is exceeded.

21 Claims, 4 Drawing Sheets

SYSTEM AND METHOD FOR AIRCRAFT THERMAL CAPACITY PREDICTION

The present application claims the benefit of U.S. Provisional Patent Application Ser. No. 61/525,004 filed Aug. 18, 2011 entitled "Aircraft Thermal Capacity Prediction/Adaptation" which is hereby incorporated by reference in its entirety.

GOVERNMENT RIGHTS CLAUSE

This invention was made with Government support under Contract Number N68335-11-C-0095 awarded by the U.S. Navy. The United States Navy has certain rights in the invention.

TECHNICAL FIELD OF THE DISCLOSURE

The present disclosure generally relates to systems and methods for prediction of the performance of a physical system and, more particularly, to systems and methods for aircraft thermal capacity prediction.

BACKGROUND OF THE DISCLOSURE

For aviation platforms, achieving the highest performance with the lightest weight systems that exceed the required reliability standards is paramount. Military aircraft often emphasize mission capability as the key objective, while commercial aircraft often emphasize Specific Fuel Consumption (SFC) and overall life-cycle costs. Historically, mechanical, hydraulic, and pneumatic drive systems have been used on these platforms for Environmental Control Systems (ECS), and actuation for engine and flight systems. With recent advances in high-speed bearing and cooling technologies, high-speed electrical machines are now able to achieve power densities that are competitive with or better than the aforementioned conventional drive systems. New systems are also increasingly required to have intelligent actuation control, such that they monitor their own health. All of these demands have led to a trend where the conventional mechanical, hydraulic, and pneumatic drive systems are being replaced with electrical systems. The increased use of such systems brings with it an increased need for thermal management systems.

In addition to the "electrification" trend of conventional components, demand for on-board power by conventional electronic systems has been increasing. Modern aircraft have increasingly powerful ECS, In Flight Entertainment (IFE), and avionics systems; all adding to the demand for onboard power. This trend in civilian aircraft has been preceded by a similar surge in the power requirements for military aircraft, where platforms are moving to the concept of the More Electric Aircraft (MEA). Increasingly powerful avionics, fly-by-wire, electronic warfare, and radar systems have resulted in huge increases in the demand for onboard power. Considering the smaller dimensions of these military aircraft platforms, the trend of onboard power demand on a per-passenger or per-volume basis is even greater for military than for civilian technology.

Although most electrical systems used onboard aircraft are designed to be highly efficient, the sheer magnitude of onboard power demand and unique design aspects of onboard aviation systems lead to considerable thermal management challenges. For example, even if a 1 MW system were 95% efficient, a total of 50 kW of heat would have to be rejected from the aircraft without exceeding rated temperatures. This poses significant challenges to the thermal management system, as it has to remove all of the generated waste heat with minimal temperature rise at a minimum of weight and volume.

Significant thermal management is required at all levels of power management, including generation, distribution, and conversion power electronics (PE), as well as at the application level. At the application level, heat is mostly produced by avionics, or, if present, actuators for flight control surfaces. Efficient thermal management is also required for digital electronics, power electronics and Environmental Control Systems (ECS). It is not uncommon for these systems to be cascaded; meaning that heat rejected from one system is added to the heat load of a secondary system before being rejected to an ultimate heat sink such as fuel or air.

In addition to the challenge of moving the heat efficiently to the convective surface, the ultimate rejection of heat is a challenge for aviation platforms. Airborne platforms have only two heat sinks available: fuel and ambient air. Fuel is a convenient sink for several reasons. A large quantity of fuel is available and must be carried on the aircraft regardless. Heating fuel prior to it entering the engine combustor is advantageous to the engine efficiency, although this is limited by the thermal stability of conventional jet fuel which, if compromised, can foul heat transfer surfaces. Therefore, it is generally preferred that thermal losses associated with electrification and any other unwanted heat sources are rejected to the fuel. There are exceptions, for instance, if a component sits in the area of an aircraft where the ambient air can effectively accept the losses without the need of a scoop or other component that increases aerodynamic drag. In that case, there would not be a need to route fuel to that area.

The More Electric Aircraft (MEA) concept has pushed the use of fuel as a heat sink to the limit. For some short missions on military aircraft, the amount of fuel that will be carried is determined by the electrical heat load rejection capacity requirements rather than the estimated engine fuel consumption.

While there is a large amount of fuel on-board an aircraft, its use is not evenly distributed over the flight envelope. During ground idle and idle-descent the fuel flow is very low. During take-off it is extremely high. Thus the fuel flow to the combustor nozzles rarely matches the electrical loss removal demands required by an MEA. For instance, an aircraft electrical system often requires significant cooling during idle-descent when electrical loads are relatively high (e.g., from actuation of flight control surfaces), but fuel flow is extremely low. To meet the cooling requirements, it is often required that the fuel is circulated back into the fuel tank after being used for cooling. This return-to-tank arrangement is common on military platforms. Using the fuel tank for thermal energy storage is convenient, but also has its limitations. At the beginning of the mission the hot fuel returning to tank does not significantly increase the overall temperature of the fuel in the tank because of the large thermal mass available. As the mission progresses and fuel levels are reduced, the high temperature return fuel has an increasingly greater likelihood of raising the temperature of the fuel in the tank.

The other ultimate heat sink is the ambient air. Air is abundantly available around the aircraft. The quality of this air for use as a heat sink varies widely. On the ground, air can be extremely cold or hot. The air density at 2,700 meters is about two-thirds that at sea level, and at 5,500 meters the air density is one-half that at sea level. Although air at high altitude is cold, viscous heating in the boundary layer between the air and the aircraft can be significant, especially at supersonic velocities. These factors combined make air a much less effective cooling fluid than fuel at high altitude, especially at high speeds.

Exchanging heat with air is also challenging. Air is not a great heat transfer fluid, thus significant heat exchanger surface area is often needed. During flight, air can be scooped from the surrounding aircraft space and passed through a duct where it interacts with various heat exchangers. Cooling air obtained in this manner is known as "ram air". Because of the aircraft velocity, little or no fan power is needed to drive the air through the heat exchangers. However, scooping air changes the aerodynamics of the aircraft and induces drag, resulting in a fuel burn increase. In addition, if the components dumping heat into this heat sink require cooling during ground idle, a fan or similar fluid pumping device is required to move air across the heat exchangers, or the heat exchangers must be designed very large to allow for natural convection based cooling. In the engine area, heat exchangers can be placed in the bypass airstream in various ways, including a traditional heat exchanger directly in the airflow, or a surface cooler inside the engine fan bypass.

As the need to reject heat to the ambient increases with increasingly more electric aircraft, traditional solutions such as fuel cooling and ram air-cooling become problematic. With the transition to composite skin, fuel-efficient aircraft and increased power demands for aircraft subsystems such as on-board entertainment systems or advanced radars, significant thermal constraints have arisen wherein the ability of the aircraft to cool critical systems can be compromised during certain flight conditions. For any given aircraft with an established set of thermal constraints, the inability to sufficiently cool such critical systems can result in reduced flight envelopes, component failures, and even loss of aircraft. Analyzing pre-defined missions provides insight into potential thermal problems that may or may not develop during a mission. Although such insight is beneficial in determining mission capability for the aircraft, the information quickly becomes obsolete once the pilot and/or environmental characteristics deviate significantly from the assumed operating conditions originally analyzed. Therefore, missions where a pre-flight analysis indicates no thermal constraints may in fact result in reduced capability during the mission as a product of unanticipated operating or environmental conditions. In the same light, planned mission capability could possibly be extended if indications of current excess thermal capacity are observed in flight. There therefore exists a need for systems and methods to reliably predict aircraft thermal capacity during flight.

SUMMARY OF THE DISCLOSURE

Disclosed herein is a technique to identify and project the thermal capacity for an aircraft either prior to flight or in real-time during the flight. A projection of operational capability in response to real-time and time-history data is invaluable in enhancing the capability of modern aircraft.

In one embodiment, a method of operating an aircraft is disclosed, comprising the steps of; a) establishing a mission projection for the aircraft; b) flying the aircraft; c) sensing data regarding a current state of the aircraft; d) executing a prognostics model using the mission projection and the sensed data to estimate a duration until a thermal limit of the aircraft is exceeded; e) communicating the estimated duration to an operator of the aircraft; and f) changing an operating point of the aircraft based upon the estimated duration.

Other embodiments are also disclosed.

DETAILED DESCRIPTION OF THE VARIOUS EMBODIMENTS

Figure 1:
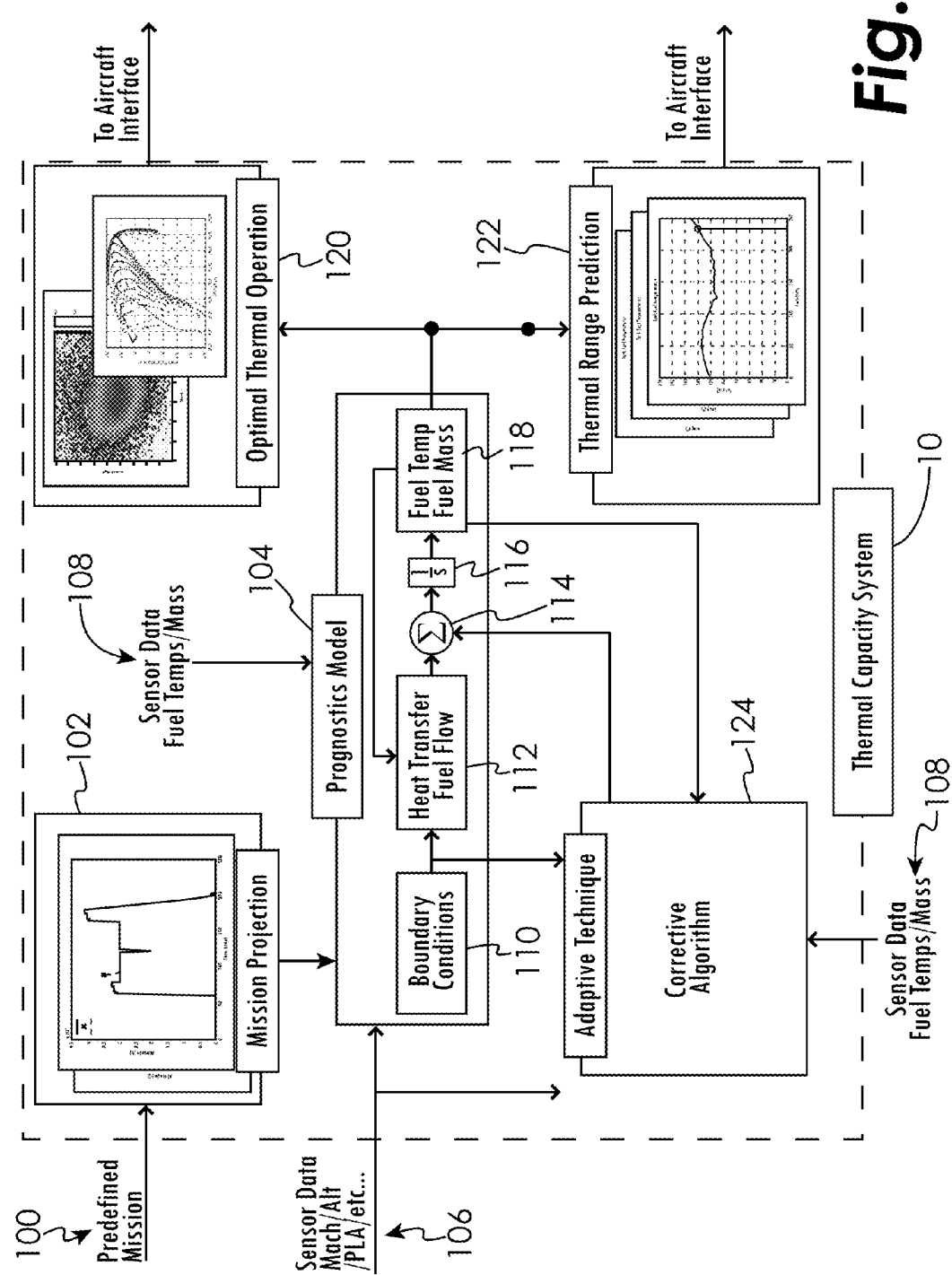
FIG. 1 is a schematic block diagram of one embodiment thermal capacity system and method according to the present disclosure.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Disclosed herein are systems and methods to identify and project the thermal capacity for an aircraft either prior to flight and/or in real-time during the flight. A projection of operational capability in response to real-time and time-history data is invaluable in enhancing the capability of modern aircraft.

The embodiments disclosed herein have the following distinct advantages:

1) By quantitatively identifying the current thermal assessment and thermal range prediction, the pilot/operator can assess the aircraft's current capabilities and avoid conditions that compromise the health of the subsystems or of the entire aircraft.
2) By adapting to historic data for a specific aircraft, the accuracy of the thermal capacity prediction is improved while not requiring tuning for each specific aircraft.
3) By identifying alternative missions/segments/flight conditions that minimize thermal constraints while maintaining range and speed, missions/flights that would have been thermally constrained/aborted are successfully completed.

In the disclosed embodiments, a system and method for real-time thermal capacity determination is presented that determines the thermally limited mission time/range through predictive analysis. An exemplary method is comprised of:
1) Mission Projection
2) Prognostic Modeling
3) Adaptive Techniques
4) Thermal Range Prediction
5) Identification of Alternative Missions/Segments for Enhanced Thermal Capacity A flowchart of one embodiment of the present the thermal capacity method is shown in FIG. 1. The method uses sensor data and a predefined mission plan as inputs, and outputs the thermally limited range/time and alternative missions/segments for enhanced thermal capacity.

Mission Projection

FIG. 1 schematically illustrates a thermal capacity system and method, indicated generally at 10. In the system 10 of FIG. 1, a predefined mission 100 is used as an input to develop a mission projection 102. The mission projection 102 is a model of the altitude the aircraft will be flown at for each time segment of the predefined mission 100. The mission projection 102 may be developed in advance of the mission, and the aircraft altitude, speed, fueling, etc. may be selected in order to keep the aircraft within its thermal capacity given expected environmental and mission conditions, considering such factors as time, range, mission segments, destination, geographical coordinates, and meteorological data, to name just a few non-limiting examples. The mission projection 102 is used as an input to the prognostics model 104.

Prognostic Modeling

In the prognostics model 104, a model of the aircraft is utilized to identify the aircraft's real-time thermal capacitance as a function of time, based on dynamic internal and external boundary conditions. It will be appreciated that the prognostics model 104, as well as the other systems and methods disclosed herein that require the manipulation of data, may be implemented by any type of data processing system capable of manipulating the data in the manner discussed, including one or more of the following: digital computer, field-programmable gate array (FPGA), complex programmable logic device (CPLD), microprocessor, digital signal processor (DSP), analog computer, and/or any combination of analog circuitry and/or analog and digital circuitry, to name just a few non-limiting examples. As with any time-domain numerical solution, initial conditions are needed for state variables along with accurate boundary conditions. Sensors 106 on the aircraft measure boundary conditions (e.g., altitude, Mach number, power level angle (PLA), ambient environment, etc.). Sensors 108 measure state variables (e.g., fuel temperature, fuel mass, etc.). Using the predefined mission projection 102, sensor 106 data for boundary conditions, and sensor 108 data for initial conditions, the prognostics model 104 predicts whether and at what point in the mission the temperature limits of the aircraft will be exceeded.

In one embodiment, the prognostics model 104 includes a boundary conditions block 110 that accepts the sensor 106 data as inputs. The output of the boundary conditions block 110 is transferred to the heat transfer/fuel flow block 112 and also to the adaptive technique block 118 (described below). The output of the heat transfer/fuel flow block 112 is summed with the output of the adaptive technique block (with corrective algorithm) 124 at 114. This summed value is integrated at 116 and this value is provided as input to the fuel temperature/fuel mass block 118. Output from the fuel temperature/fuel mass block 118 is fed back to the heat transfer/fuel flow block 112 and to the adaptive technique block 118. Additionally, the output of the fuel temperature/fuel mass block 118 is used to generate the optimal thermal operation data 120 and the thermal range prediction 122. The net result of operation of the prognostics model 104 is a calculated range or time within which the aircraft can safely operate. Predicted aircraft thermal restrictions prior to mission completion are determined and relayed to the pilot as a remaining range or time until a thermal constraint is exceeded.

Although predefined missions 102 allow for preliminary assessment of mission capability, uncertainties in flight deviations and environmental conditions will almost always generate error in this preliminary analysis (i.e., cause the actual mission to vary from the projected mission). To minimize this error, regular refreshes of the prognostics model 104 are performed throughout the flight profile using real-time data from available sensors 106, 108 to adapt to real-time flight operation. Meteorological information regarding the ambient environment is entered into the algorithm prior to takeoff, but if discrepancies are found between the actual environment and the predicted environment as the aircraft flies, the algorithm uses actual measured values in subsequent refreshes of the prognostics model 104. In addition, using fuel temperature/mass sensor 108 data as initial conditions for the prognostics model 104, each refresh of the prognostics model 104 will provide a more accurate depiction of remaining thermal capacity as the mission progresses, including post-refueling. Lastly, the thermal capacity system 10 also analyzes the current operating point (e.g., altitude, Mach number, PLA, ambient environment, etc.) to project the remaining thermal capacity of the aircraft, assuming the pilot remains at the current operating point indefinitely, Mission Profile Adjustments The prognostic model 104 can provide an accurate assessment of thermal limitations on the aircraft, but the accuracy of the predictions is a function of the predicted boundary conditions, namely the assumed mission profile 102. The prognostic model 104 will utilize an assumed Mach number and altitude profile to determine boundary conditions such as solar loading, convection, fuel flow rates, etc., to name just a few non-limiting examples. Deviations from the predefined mission 100 will result in prediction errors with respect to thermal capacity. To address this uncertainty, the mission profile adjustment method quantifies the thermal capacity for the current conditions with the assumption that the pilot/operator will return to the predefined mission immediately (i.e., the pilot is assumed to have only temporarily deviated from the predefined mission 100).

Adaptive Techniques

Although the aircraft prognostic model 104 captures primary component performance and material properties for an aircraft model, general tolerances in manufacturing processes and different payload configurations lead to uncertainties in predicted thermal capacity for each individual aircraft. In addition, as component performance degrades throughout the useful life of each component on the aircraft, the efficiency (and hence the heat generated by each component) will change over the life of the aircraft, increasing the discrepancy with the assumed baseline aircraft model. These differences, coupled with modeling errors, may result in appreciable thermal capacity prediction error. By employing adaptive or learning techniques, such as neural networks, the thermal capacity system 10 can account for such uncertainties, providing a more accurate prediction. This is done by providing the adaptive technique block (with corrective algorithm) 124 that receives as inputs the sensor 106 and 108 data, the output of the boundary conditions block 110, and the output of the fuel temperature/fuel mass block 118 (for example).

It will be appreciated that the form of the prognostics model 104 and adaptive technique section 124 may vary from application to application, based upon the differing characteristics of the systems being modeled. For example, the ordinary differential equation to determine fuel tank temperature is given as, $$mC_p \frac{dT}{dt} = \dot{Q}_{amb} + \dot{Q}_{pump} + \dot{Q}_{in} - \dot{Q}_{out} \qquad (1)$$

The adaptive technique section 124 adds a correction term to account for discrepancies between measured temperature and predicted temperatures. The corrective term will be a function of the boundary conditions and temperature error, and will be added to the equation as, $$mC_p \frac{dT}{dt} = \dot{Q}_{amb} + \dot{Q}_{pump} + \dot{Q}_{in} - \dot{Q}_{out} - \dot{Q}_{corr} \quad (2)$$

The correction term is determined by comparing flight data to the predicted data from the prognostics model 104. The data is run through error reduction algorithms that analyze multi-dimensional inputs and output a corrective term that drives the observed error to zero. The correction term is updated in successive flights as component wear alters the originally predicted performance. It will be appreciated that the specific calculation for any corrective term will vary from application to application.

As shown in FIG. 1, the adaptive technique section 124 will adjust the heat transfer and/or fuel flow terms from block 112 to account for any model discrepancies. In some embodiments, the update rate for the adaptive technique section 124 is slower than the regular refresh rates used by the prognostics model 104. The longer time span will allow for a larger accumulation of data in order to train the adaptive technique section 124.

Thermal Range Prediction

Figure 2:
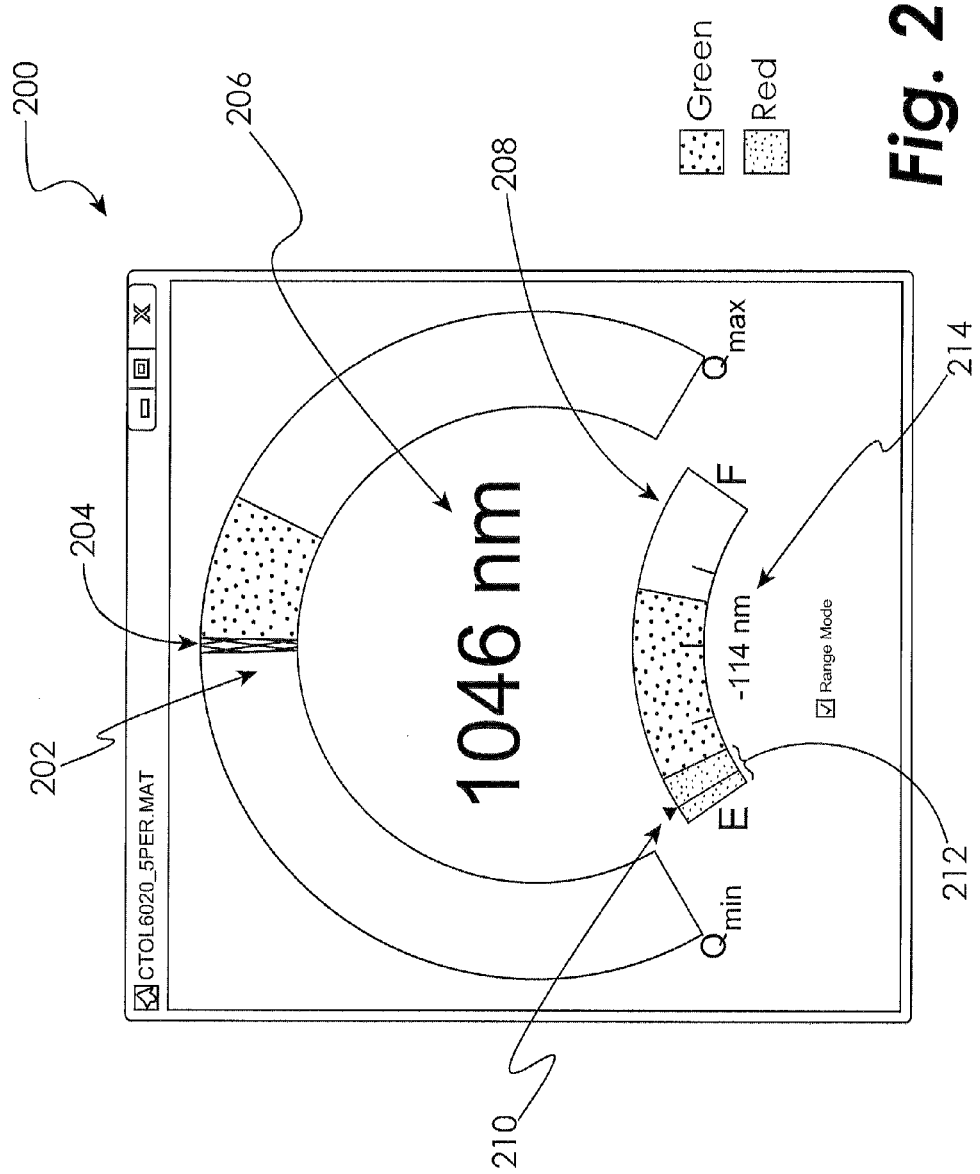
FIG. 2. is one embodiment of a cockpit display showing real-time thermal capacity according to one embodiment of the present disclosure.

The output of the thermal capacity system 10 is a thermal range prediction 122. The range can be displayed in the form of miles and/or time remaining before the aircraft exceeds its thermal capacity, providing the pilot/operator with an assessment for probability of mission completion. FIG. 2 shows one embodiment of a display 200 for the pilot/operator. The display 200 may include a first non-numerical visual indicator, such as the first bar graph 202, that indicates the current operating condition of the aircraft with respect to heat rejection. The bar graph 202 plots in real time the magnitude of the net heat out of (displayed in green, for example) or into (displayed in red, for example) the aircraft. In the display shown in FIG. 2, the heat rejection off of the aircraft is greater than the heat generated on-board the aircraft, as indicated by the green bar to the right of the midpoint line 204 (lined for the color green in the patent drawing figure). The greater the net heat out of the aircraft, the further the green bar moves to the right of the midpoint line 204. The midpoint line 204 indicates a balance point where the heat rejection off of the aircraft just equals the heat generated onboard the aircraft. In situations where the heat rejection off of the aircraft is less than the heat generated on-board the aircraft, the bar graph 202 will display a red bar to the left of the midpoint line 204 (not shown). The greater the net heat into the aircraft, the further the red bar moves to the left of the midpoint line 204.

Another feature of the display 200 is the first numerical display 206 below the bar graph 202 that indicates the range and/or time (in nautical miles and/or minutes, for example) the aircraft can remain in the current operating point (Mach and altitude, for example) until the aircraft runs out of fuel or exceeds a thermal limit. In some embodiments, the first number display 206 may be color coded. For example, if the range and/or time that the current operating point can be maintained is less than that required for the current mission projection 102, then the number display 206 may be shown in green. On the other hand, showing the number display 206 in red may be used to designate that the current operating point will be thermally constrained prior to completion of the mission projection 102.

A further feature that the display 200 may include is a second non-numerical visual indicator, such as the second bar graph 208, including a bar indicator 210 that shows the amount of fuel projected to be remaining on the aircraft at landing. The bar graph 208 may include a red portion 212 (lined for the color red in the patent drawing figure) indicating a range of the amount of fuel on the aircraft that will result in a thermal constraint being exceeded for the planned mission. Therefore, if the fuel projected to be remaining on the aircraft at landing (as indicated by the bar indicator 210) is within the red portion 212, a thermal constraint will be exceeded prior to the aircraft landing and the pilot cannot complete the mission. A second numerical display 214 under the second bar display 208 quantifies the nautical miles prior to landing at which the aircraft will exceed the thermal constraint. In some embodiments, the second number display 206 may be color coded. For example, if a deficit in the range and/or time required for the current mission projection 102 exists, then the number display 214 may be shown in red as a negative number. On the other hand, if no deficit in the range and/or time required for the current mission projection 102 exists, the number display 214 may be shown in green as a positive number. The ranges can be displayed in miles and/or time and, in some embodiments, the units may be toggled by the pilot by use of an appropriate control input. The pilot can utilize the information to make decisions regarding current and future operation of the aircraft to ensure successful completion.

Identification of Alternative Missions/Segments/Flight Conditions

Figure 3:
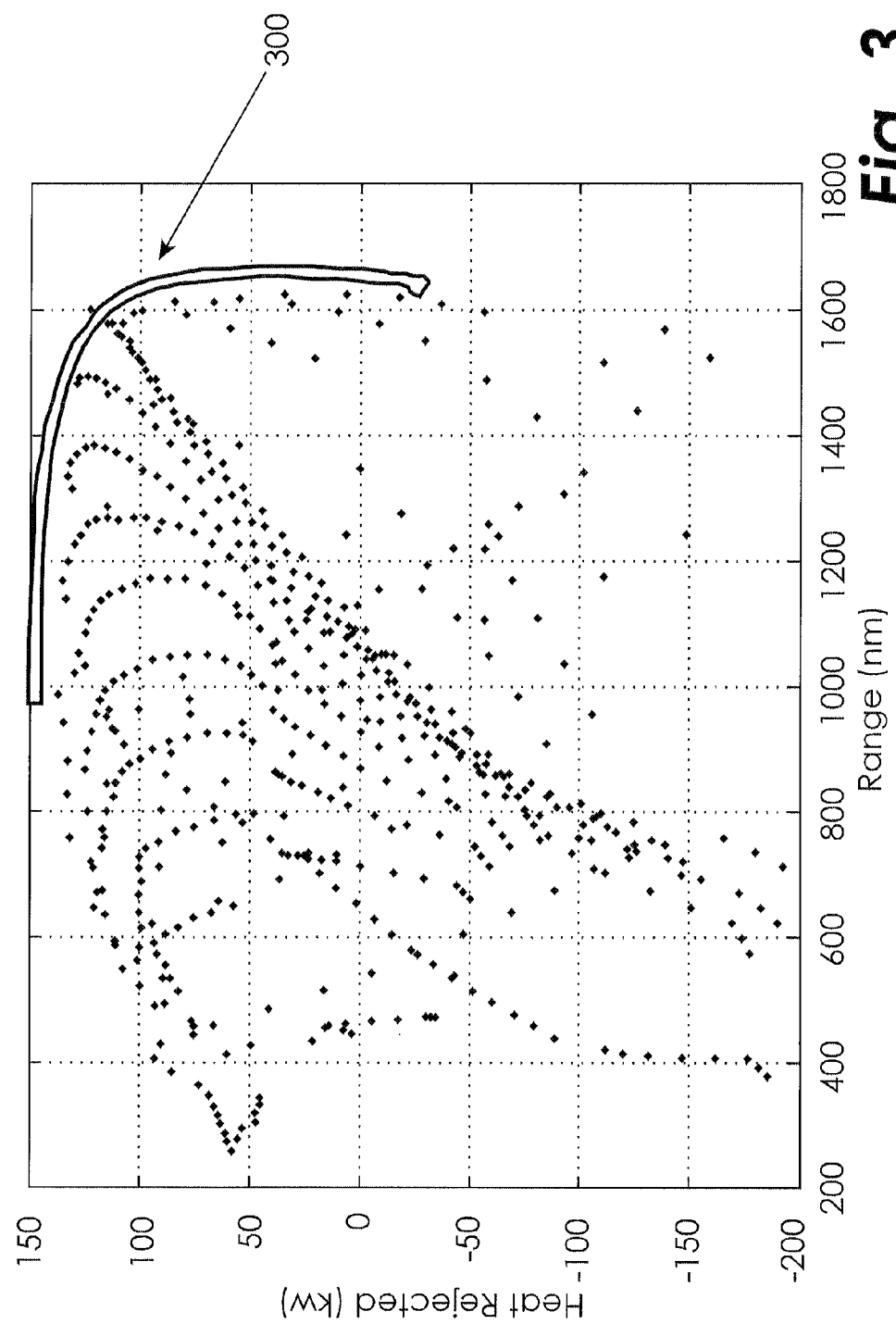
FIG. 3, is a chart illustrating trade-off between aircraft range and thermal capacity.
Figure 4:
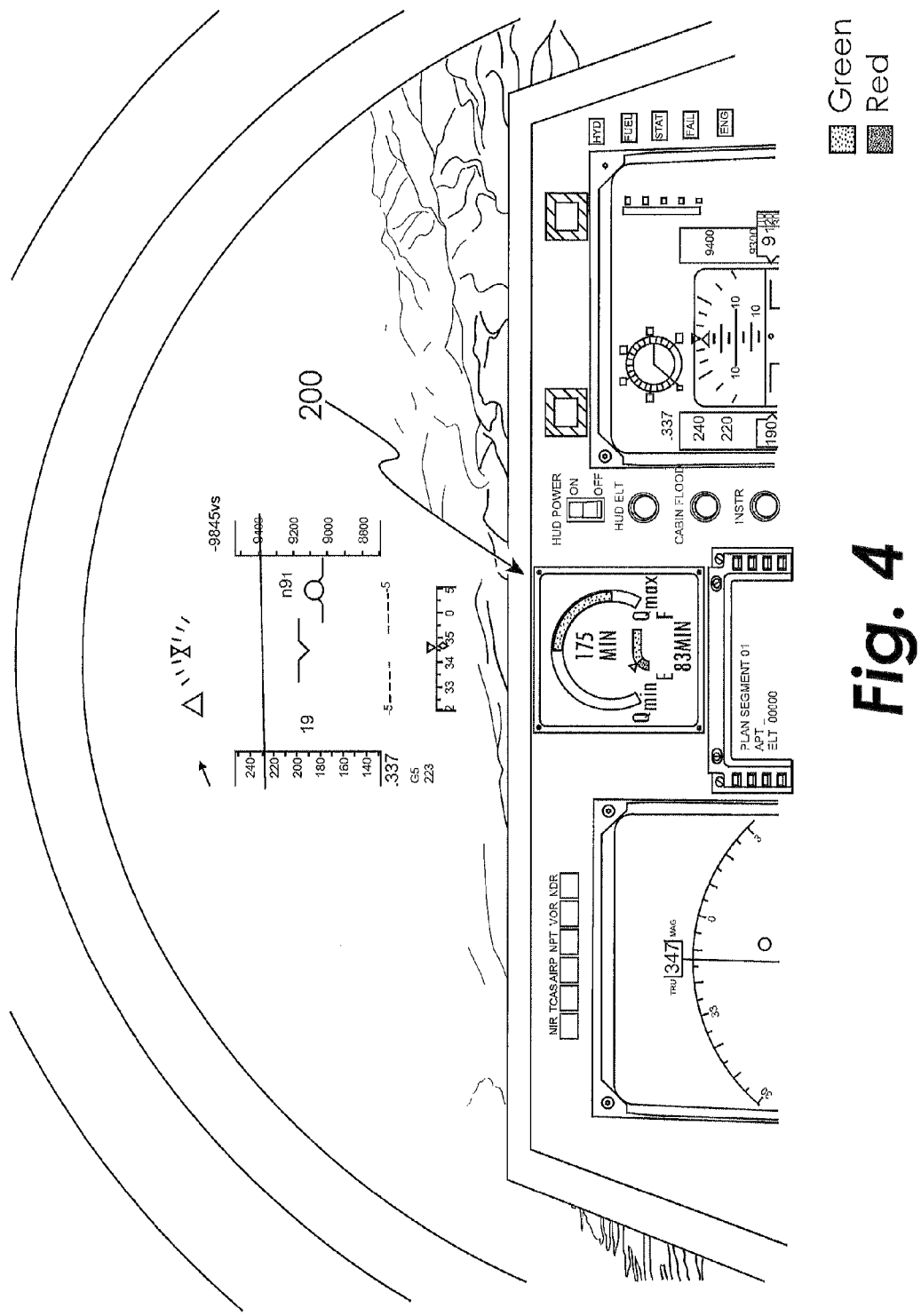
FIG. 4, is an illustration of placement of the display of FIG. 2 in a cockpit according to one embodiment of the present disclosure.

The thermal capacity prediction system 10 also include a technique to identify alternative missions/segments/flight conditions to maximize the range/time before thermal constraints are exceeded, while attempting to maintain fuel range and aircraft capabilities. One of the outputs of the prognostics model 104 is the optimal thermal operation information 120. The alternative flight plans may be displayed to the pilot/operator in real-time. In some embodiments, the alternative flight plans are displayed as trades between thermal capacity, system capabilities, fuel range, and aircraft speed. For example, as shown in FIG. 3, the optimal thermal operation information 120 may include information showing the relationship between heat rejected from the aircraft and predicted range of the aircraft. A Pareto Front 300 may be indicated on the graph to show the best compromise between aircraft fuel range and heat rejected. In some embodiments, this optimal point is represented as a Mach number and altitude at which the pilot should operate the aircraft in order to maximize heat rejection versus fuel range. Throughout the flight, the pilot will have access to the optimal Mach number and altitude via the pilot vehicle interface and can therefore choose to alter the mission to fly at the preferred operating point Thermal Capacity Display within the Cockpit FIG. 4 illustrates one possible location for the thermal capacity display 200 in an aircraft cockpit. While the invention has been presented in the context of a specific embodiment, this is for the purpose of illustration rather than limitation. Other variations and modifications of the specific embodiment shown and described will be apparent to those skilled in the art within the intended spirit and scope of the invention as set forth in the appended claims.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

What is claimed:

1. A method of operating an aircraft, comprising the steps of:
   a) establishing a mission projection for the aircraft;
   b) flying the aircraft;
   c) sensing data regarding a current state of the aircraft;
   d) executing a prognostics model using the mission projection and the sensed data to estimate a duration until a thermal limit of the aircraft is exceeded, wherein the prognostics model outputs optimal thermal operation information comprising an alternative flight plan, wherein the alternative flight plan is displayed as trades between thermal capacity, system capabilities, fuel range, and aircraft speed;
   e) communicating the estimated duration to an operator of the aircraft; and
   f) changing an operating point of the aircraft based upon the estimated duration.

2. A method of operating an aircraft, comprising the steps of:
   a) establishing a mission projection for the aircraft;
   b) flying the aircraft;
   c) sensing data regarding a current state of the aircraft;
   d) executing a prognostics model using the mission projection and the sensed data to estimate a duration until a thermal limit of the aircraft is exceeded, wherein the prognostics model outputs optimal thermal operation information comprising data showing a relationship between heat rejected from the aircraft and predicted range of the aircraft;
   e) communicating the estimated duration to an operator of the aircraft; and
   f) changing an operating point of the aircraft based upon the estimated duration.

3. The method of claim 2, wherein the optimal thermal operation information includes a Pareto front showing a best compromise between heat rejected from the aircraft and predicted range of the aircraft.

4. A method of operating an aircraft, comprising the steps of:
   a) establishing a mission projection for the aircraft;
   b) flying the aircraft;
   c) sensing data regarding a current state of the aircraft, wherein the sensed data is selected from the group consisting of: altitude, speed, power level angle, ambient temperature, ambient pressure, fuel temperature, and fuel mass;
   d) executing a prognostics model using the mission projection and the sensed data to estimate a duration until a thermal limit of the aircraft is exceeded;
   e) communicating the estimated duration to an operator of the aircraft; and
   f) changing an operating point of the aircraft based upon the estimated duration.

5. The method of claim 4, wherein the mission projection comprises a model of an altitude the aircraft will be flown at for each time segment of a predefined mission.

6. The method of claim 4, wherein the prognostics model models the aircraft's real-time thermal capacitance as a function of time based on dynamic internal and external boundary conditions.

7. The method of claim 4, wherein the prognostics model comprises:
   a boundary conditions block that accepts the sensed data and mission projection as inputs and creates a boundary conditions output;
   an adaptive technique section that accepts the sensed data, the boundary conditions output, and a fuel temperature/fuel mass output as inputs and creates a corrective term as an output;
   a heat transfer/fuel flow block that accepts the boundary conditions output and the fuel temperature/fuel mass output as inputs and creates a heat transfer/fuel flow output;
   a summing block that sums the heat transfer/fuel flow output and the corrective term to create a sum output;
   an integrator that integrates the sum output to create an integrator output; and
   a fuel temperature/fuel mass block that accepts as an input the integrator output and produces the fuel temperature/fuel mass output.

8. The method of claim 7, wherein the fuel temperature/fuel mass output is used to generate the estimated duration.

9. The method of claim 7, wherein the boundary conditions output is selected from the group consisting of: solar loading, convection, and fuel flow rate.

10. The method of claim 7, wherein the prognostics model is executed repeatedly at a first rate while the aircraft is flown.

11. The method of claim 10, wherein the adaptive technique creates the corrective term at a second rate, wherein the second rate is slower than the first rate.

12. The method of claim 4, wherein the operating point is selected from the group consisting of: altitude, speed, and fueling.

13. The method of claim 4, wherein if the aircraft is not currently on the mission projection, the prognostics model estimates the duration by assuming that the operator will return the aircraft to the mission projection immediately.

14. The method of claim 4, wherein the estimated duration comprises data selected from the group consisting of: distance, and time.

15. The method of claim 4, wherein step (e) comprises creating a display visible to the operator, the display comprising:
   a first non-numerical visual indicator communicating a current of net heat into or out of the aircraft;
   a first numerical display communicating the estimated duration;
   a second non-numerical visual indicator communicating an amount of fuel projected to be remaining when the aircraft lands; and
   a second numerical display communicating a distance prior to landing that the aircraft will exceed the thermal limit.

16. The method of claim 4, wherein the prognostics model outputs optimal thermal operation information for the aircraft.

17. The method of claim 16, wherein the optimal thermal operation information comprises an alternative flight plan.

18. The method of claim 17, wherein the alternative flight plan is displayed in real-time.

19. The method of claim 17, wherein the alternative flight plan is displayed as Mach number and altitude.

20. The method of claim 4, wherein steps (a), (d) and (e) are performed by a processing device selected from the group consisting of: a digital computer, a field-programmable gate array, a complex programmable logic device, a microprocessor, a digital signal processor, an analog computer, analog circuitry, and digital circuitry.

21. The method of claim 4, wherein the mission projection is based on one or more factors selected from the group consisting of: time, range, mission segments, destination, geographical coordinates, or meteorological data.

* * * * *